(12) United States Patent
Lee et al.

(10) Patent No.: US 8,799,290 B2
(45) Date of Patent: Aug. 5, 2014

(54) APPARATUS AND METHOD FOR PROCESSING CONTENTS

(75) Inventors: Bo-ra Lee, Seoul (KR); Ji-hye Chung, Seoul (KR); Hye-jeong Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 98 days.

(21) Appl. No.: 13/037,473

(22) Filed: Mar. 1, 2011

(65) Prior Publication Data

US 2012/0054188 A1 Mar. 1, 2012

(30) Foreign Application Priority Data

Aug. 31, 2010 (KR) .................. 10-2010-0085142

(51) Int. Cl.
*G06F 17/30* (2006.01)

(52) U.S. Cl.
USPC .......................................... 707/740

(58) Field of Classification Search
USPC ................ 707/2, 3, 740; 709/225; 715/835
See application file for complete search history.

(56) References Cited

U.S. PATENT DOCUMENTS

| | | | | |
|---|---|---|---|---|
| 6,570,597 | B1 * | 5/2003 | Seki et al. | 715/835 |
| 2002/0060246 | A1 * | 5/2002 | Gobburu et al. | 235/462.46 |
| 2002/0147517 | A1 | 10/2002 | Messler | |
| 2004/0098360 | A1 | 5/2004 | Witwer et al. | |
| 2004/0194034 | A1 | 9/2004 | Vlamis | |
| 2005/0097081 | A1 | 5/2005 | Sellen et al. | |
| 2007/0157121 | A1 * | 7/2007 | Kim et al. | 715/810 |
| 2008/0016218 | A1 * | 1/2008 | Jones et al. | 709/226 |
| 2009/0193461 | A1 * | 7/2009 | Yuki et al. | 725/39 |
| 2010/0017314 | A1 * | 1/2010 | Johnson et al. | 705/30 |
| 2010/0094878 | A1 * | 4/2010 | Soroca et al. | 707/748 |
| 2011/0314419 | A1 * | 12/2011 | Dunn et al. | 715/810 |

FOREIGN PATENT DOCUMENTS

WO 01/16670 A2 3/2001

OTHER PUBLICATIONS

Communication dated Dec. 15, 2011, issued by the European Patent Office in corresponding European Patent Application No. 11176786.9.

* cited by examiner

*Primary Examiner* — Etienne LeRoux
(74) *Attorney, Agent, or Firm* — Sughrue Mion, PLLC

(57) ABSTRACT

An apparatus and method for processing content. In the method for processing content, a query for retrieving content to be stored is generated by combining a main category, a user's keyword, and a sub-category of the main category. The content is retrieved using the generated query. The content is classified and stored in a scrap book of the sub-category.

21 Claims, 16 Drawing Sheets

FIG. 5A

```
SCRAP BOOK THEME: INPUT TRIP KEYWORD

DESTINATION        |        VIETNAM        |
FLIGHT INFORMATION | DEPARTURE DATE | ARRIVAL DATE |
UPDATE CYCLE       | EVERY EXECUTION/EVERY DAY/
                     EVERY MONTH
                        [ Create ]  [ Cancel ]
```

APPARATUS AND METHOD FOR PROCESSING CONTENTS

CROSS-REFERENCE TO RELATED APPLICATION

This application claims priority from Korean Patent Application No. 10-2010-0085142, filed on Aug. 31, 2010, in the Korean Intellectual Property Office, the disclosure of which is incorporated herein by reference in its entirety.

BACKGROUND

1. Field

The present disclosure herein relates to an apparatus and method for processing content, and more particularly, to a content processing apparatus and method for efficiently collecting content fit for user's purposes.

2. Description of the Related Art

Recently, the Internet is overflowing with various content, and it becomes increasingly difficult for a user to search for desired information on the Internet.

Reflecting this trend, various methods for retrieving web content using various Internet searching technologies and methods for managing the searched content have been proposed.

As an example, a method for dividing a web browser into a left region and a right region, generating and managing a template in a left window, and managing a web page in a right window is being proposed.

In this method, a template designed for a user's purpose may be generated in the left region. Then a user fills in the template by selecting content of a web page provided in the right region and dragging and dropping the selected content into the template. However, there are limitations to the above method. For example, the generated content in stored the template is difficult to systematically manage and update.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a content processing apparatus and method for combining a main category, a user's keyword, and a sub-category to generate a query on content to be included in the sub-category; systematically retrieving the content; and efficiently managing the retrieved content.

According to an aspect of an exemplary embodiment, there is provided a method for processing content in a content processing apparatus, including: combining a main category, a user's keyword, and a sub-category with respect to the main category to generate a query on content to be included in a scrap book; retrieving the content using the generated query; and classifying the retrieved content and storing the content in the scrap book of the sub-category.

The method may further include displaying the scrap book of the sub-category in which the retrieved content is stored in a form of an icon.

The type and number of the scrap books of the sub-category displayed in the form of the icon may be predetermined.

The sub-category may include at least one category corresponding to the main category, and the generating of the query may include generating respective queries corresponding to at least one category.

The method may further include receiving the user's keyword which is related to the main category.

The method may further include displaying the icon representing the scrap book of the sub-category in which the retrieved content is classified and stored and an icon representing a scrap book of the main category together.

The method may further include displaying at least one icon representing the scrap book of the sub-category when the icon representing the scrap book of the main category is selected.

The method may further include displaying at least one of a first mini icon for viewing the content included in the scrap book of the sub-category and a second mini icon for editing the content included in the scrap book of the sub-category when a focus is placed on the scrap book of the sub-category that is displayed in the form of the icon.

The method may further include displaying the content included in the scrap book of the sub-category on which the focus is placed when the first mini icon is selected.

The method may further include displaying a menu for editing the content included in the scrap book of the sub-category on which the focus is placed when the second mini icon is selected. Here, the editing of the content may include one of deleting and updating of the content included in the scrap book of the sub-category on which the focus is placed.

According to an aspect of another exemplary embodiment, there is provided an apparatus for processing content, including: a storage unit storing the content; a query generation unit combining a main category, a user's keyword, and a sub-category with respect to the main category to generate a query on content to be included in a scrap book; a retrieving unit retrieving the content using the generated query; and a control unit controlling the storage unit such that the retrieved content is classified and stored in the scrap book of the sub-category.

The apparatus may further include a display unit displaying the scrap book of the sub-category in which the retrieved content is stored in a form of an icon.

The type and number of the scrap books of the sub-category displayed in the form of the icon may be predetermined.

The sub-category may include at least one category corresponding to the main category, and the query generation unit may generate respective queries corresponding to at least one category.

The apparatus may further include a user input unit receiving the user's keyword related to the main category.

The control unit may control the display unit to display the icon representing the scrap book of the sub-category in which the retrieved content is classified and stored, and an icon representing a scrap book of the main category together.

The control unit may control the display unit to display at least one icon representing the scrap book of the sub-category subordinate to the main category when the icon representing the scrap book of the main category is selected.

The control unit may control the display unit to display at least one of a first mini icon for viewing the content included in the scrap book of the sub-category and a second mini icon for editing the content included in the scrap book of the sub-category when a focus is placed on the scrap book of the sub-category that is displayed in the form of the icon.

The control unit may control the display unit to display the content included in the scrap book of the sub-category on which the focus is placed when the first mini icon is selected.

The control unit may control the display unit to display a menu for editing the content included in the scrap book of the sub-category on which the focus is placed when the second mini icon is selected, and the editing of the content may include one of deleting and updating of the content included in the scrap book of the sub-category on which the focus is placed.

Additional aspects and advantages of the exemplary embodiments will be set forth in the detailed description, will be obvious from the detailed description, or may be learned by practicing the exemplary embodiments.

BRIEF DESCRIPTION OF THE DRAWINGS

The above and/or other aspects will become apparent and more readily appreciated from the following description of the embodiments, take in conjunction with the accompanying drawings, in which:

FIGS. 5A through 5C are diagrams illustrating an operation of generating a new scrap book;

DETAILED DESCRIPTION OF THE EXEMPLARY EMBODIMENTS

Figure 1:
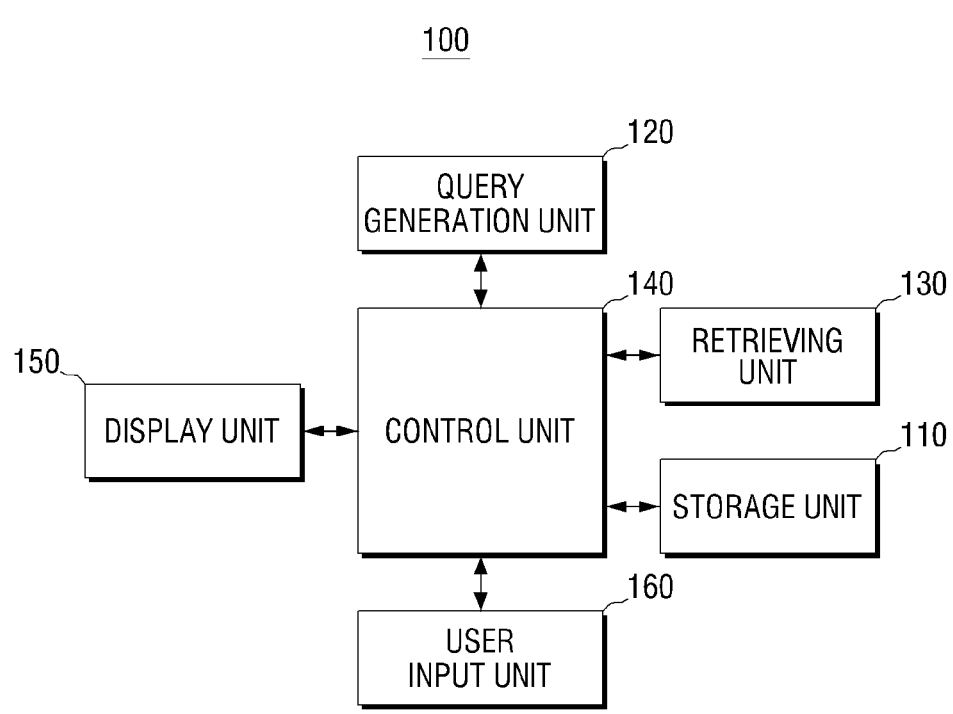
FIG. 1 is a diagram illustrating a content processing apparatus according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a diagram illustrating a content processing apparatus according to an exemplary embodiment Referring to FIG. 1, a content processing apparatus 100 may include a storage unit 110, a query generation unit 120, a retrieving unit 130, a control unit 140, a display unit 150, and a user input unit 160.

The storage unit 110 may store at least one template in which content and/or a web page is provided. Here, the content may include at least one of drawings, symbols, texts, and images of the web page. Here, the template may signify a format, a frame, and a model that is used to serve as a guide in creating something, and may be represented using a layout.

On the other hand, the content may be a comprehensive concept including at least one of drawings, symbols, texts, images, and templates of a web page.

Also, the storage unit 110 may classify content retrieved by the retrieving unit 130 and store it in a sub-category.

The storage unit 110 may store a generated scrap book.

The query generation unit 120 may combine a main category, a user's keyword, and a sub-category which is subordinate to the main category to generate a query for retrieving content to be included in the sub-category.

The main category may be an uppermost concept of content which a user intends to search for. The sub-category may be a concept representing a category subordinate to the main category.

In one embodiment, when the main category is "travel", the sub-category may include local, traffic, restaurant, checklist, and weather. In another embodiment, when the main category is "movie", the sub-category may include director, cast, theater, genre, trailer, and location. Also, the sub-category may have a layer structure including a first sub-category and a second category subordinate to the first sub-category.

The main category may be expressed as theme, subject, or etc.

The retrieving unit 130 may retrieve content using the generated query. The retrieving unit 130 may be implemented with a search engine. Also, the retrieving unit 130 may instruct a search engine disposed outside of the content processing apparatus 100 to search for content.

The control unit 140 may control a storage unit 110 to classify and store the retrieved content in the sub-category.

The control unit 140 may control the display unit 150 to display an icon representing an already-stored scrap book and an icon representing a scrap book of the main category together. In the already-stored scrap book, the retrieved content may be classified and stored in the scrap book of the sub-category.

Here, the scrap book may include at least one web page related to a specific category, and the retrieved content may have been retrieved from the web page when a content retrieval is performed based on the generated query. The scrap book may be a sort of folder in which a retrieval result is classified and stored, and may be displayed in a form of an icon representing a specific category. Here, the at least one web page may include content and a layout, respectively. Also, the web page may be expressed as a chapter.

On the other hand, the icon may be expressed as a button.

The control unit 140 may control the display unit 150 to display at least one icon representing the scrap book of the sub-category when the icon representing the scrap book of the main category is selected.

The control unit 140 may control the display unit 150 to display at least one of a first mini icon for viewing content included in the scrap book of the sub-category, and a second mini icon for editing the content included in the scrap book of the sub-category in response to a focus being placed on the icon of the scrap book of the sub-category.

Here, the focus may be placed on the icon by moving a pointer to the icon through the use of a mouse, or the like, or a remote control may designate the icon.

The control unit 140 may control the display unit 150 to display the content of the scrap book of the sub-category on which the focus is placed in response to the first mini icon being selected.

Alternatively, the control unit 140 may control the display unit 150 to display a menu for editing the content of the scrap book of the sub-category on which the focus is placed in response to the second mini icon being selected.

Here, the editing of the content may include at least one of deleting and updating the sub-category on which the focus is placed. Also, the deleting of the sub-category may include partial deletion in which only data of the sub-category, except its layout, is removed, and whole deletion in which its layout and data are all removed.

The display unit 150 may display icons representing content, templates, and scrap books, icons representing already-generated scrap books, and mini icons for showing or editing the scrap books.

The display unit 150 may display the scrap book of the sub-category in which the retrieved content is stored, in a form of an icon.

The display unit 150 may display an icon representing the already-stored scrap book in which the already-retrieved content is classified into the scrap book of the sub-category, and an icon representing the scrap book together.

The display unit 150 may display at least one icon representing the scrap book of the sub-category in response to the icon representing the scrap book of the main category being selected.

The display unit 150 may display at least one of the first mini icon for viewing a web page (contents) included in the scrap book of the sub-category, and the second mini icon for editing the web page (contents) included in the scrap book of the sub-category in response to a focus being placed on the scrap book of the sub-category that is displayed in the form of the icon.

The display unit 150 may display the web page (contents) included in the scrap book of the sub-category on which the focus is placed in response to the first mini icon being selected.

The display unit 150 may display the menu for editing the web page (contents) of the sub-category on which the focus is placed in response to the second mini icon being selected.

The display unit 150 may have a touchscreen function. In this case, the display unit 150 may perform an operation of the user input unit 160 that will be described below.

The user input unit 160 may receive the user's keyword. The user's keyword may be a keyword related to the main category. The user's keyword may be a subordinate category included in the sub-category.

The content processing apparatus 100 may include various apparatuses that can perform at least one operation of retrieval, reception, replay, storage, generation, and editing. In one embodiment, the content processing apparatus 100 may include TVs, PMPs, PDAs, cellular phones, smart phones, laptops, and tablet PCs.

The content processing apparatus 100 may carry various types of web browsers, and may display a web page including at least one of content and the layout using the web browser.

According to the content processing apparatus 100, a user can more easily retrieve desired content, and classify and display the main category and the sub-category subordinate to the main category more conveniently. Accordingly, collection and management of content can be more easily achieved while minimizing the amount of input required from the user.

Figure 2:
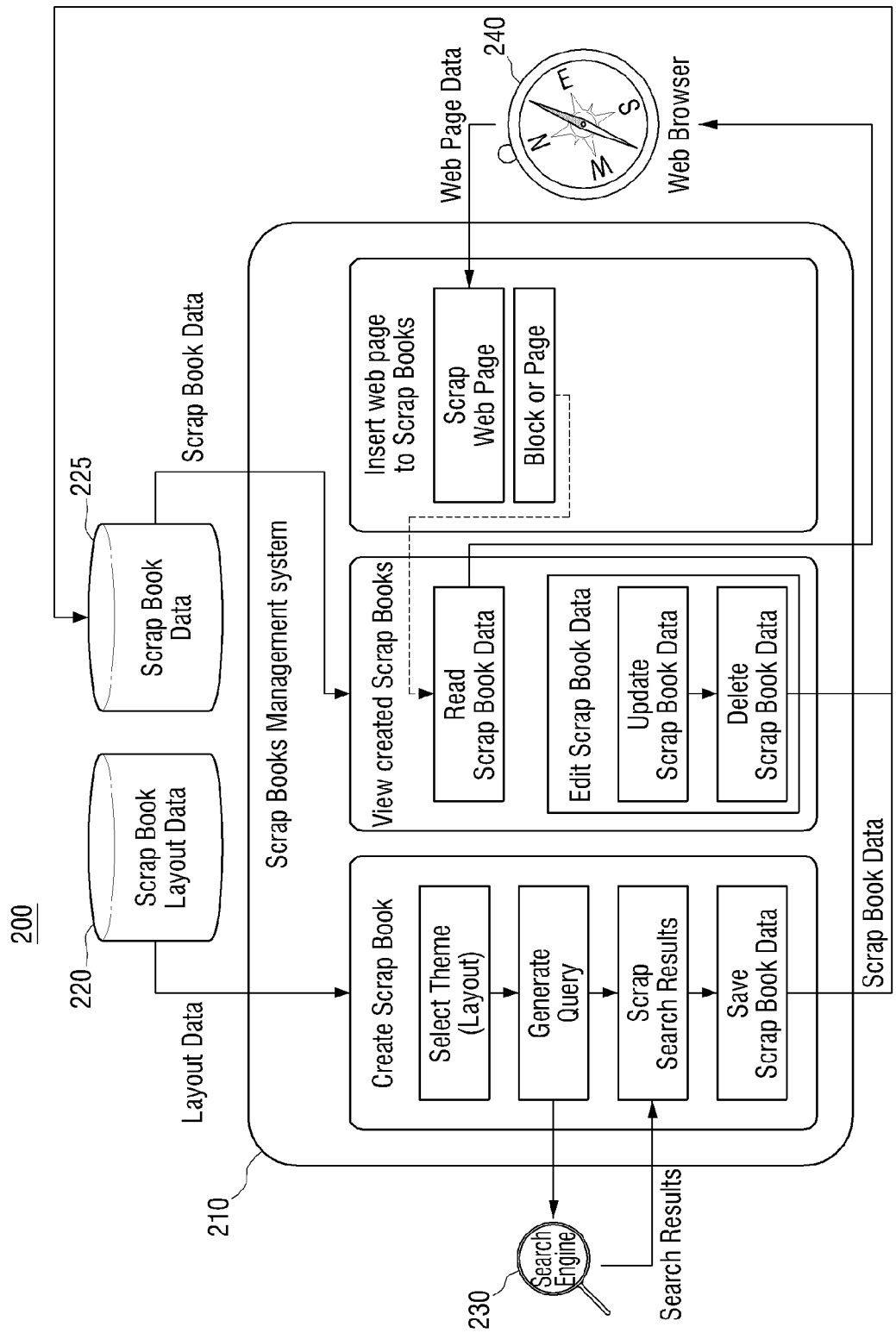
FIG. 2 is a more detailed diagram illustrating a content processing apparatus.

FIG. 2 is a more detailed diagram illustrating a content processing apparatus.

Referring to FIG. 2, a content processing apparatus 200 may include a scrap book management system 210, a scrap book layout data storage 220, a scrap book data storage 225, a search engine 230, and a web browser 240.

The scrap book layout data storage 220 and the scrap book data storage 225 may be provided in the storage unit 110 shown in FIG. 1.

The scrap book management system 210 may perform at least one of an operation for generating a scrap book, an operation for showing the generated scrap book, and an operation for inserting a web page (or content of the web page) into the scrap book.

First, the operation for generating the scrap book performed by the scrap book management system 210 will be described in detail below.

When a user selects a desired theme (that is, main category), the scrap book management system 210 may load layout data of the theme selected by the user from the scrap book layout data storage 220.

Also, the scrap book management system 210 may receive a keyword from the user. Queries may be generated for each chapter (that is, sub-category), using a query generation algorithm of the layout data and the received keyword.

The layout data may be configured with the layout of the web page, and may be classified for each chapter to be stored in the scrap book layout storage 220.

Thereafter, when the search engine retrieves content using the generated query, the scrap book management system 210 may clip a retrieved result (retrieved content).

Thereafter, the scrap book management system 210 may store the retrieved result (retrieved content) according to the layout, and may classify it for each chapter.

Thus, the scrap book management system 210 may generate a new scrap book.

Hereinafter, an operation of viewing the generated scrap book by the scrap book management system 210 will be described.

The scrap book management system 210 may browse scrap book data read from the scrap book data storage 225 using the web browser 240.

The scrap book data may include content of a clipped web page, and may be classified for each chapter to be stored in the scrap book data storage 225.

A user may view the scrap book by browsing already-stored URL information of a retrieved web page and the scrap book data using the web browser 240.

Also, the operation of editing the scrap book data may include an operation of deleting or updating the web page (or retrieved content) stored in the scrap book data storage 225. The scrap book data stored in the scrap book data storage 225 may be updated by retrieving the URL information and the scrap book data read out from the scrap book data storage 225 using the search engine 230.

Finally, an operation of adding the content of the web page to the scrap book by the scrap book management system 210 will be described below.

The scrap book management system 210 may add all or some content constituting the web page to the scrap book data, or may add the whole of the web page to the scrap book data.

Figure 3:
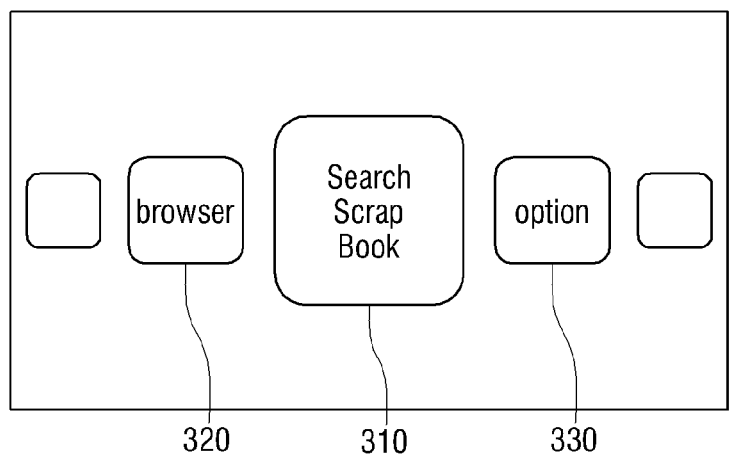
FIG. 3 is a diagram illustrating a screen for executing a scrap book search.

FIG. 3 is a diagram illustrating a screen for executing a search scrap book.

The search scrap book may indicate an application that can perform a retrieval operation according to a desired purpose of a user, perform an update at an predetermined interval because the retrieved result is stored in a form of a scrap book, and edit or add the web page (or retrieved content of the web page) provided in the scrap book.

Referring to FIG. 3, a search scrap book icon 310, a browser icon 320, and an option icon 330 may be displayed on a display unit 150 of a content processing apparatus 100.

A button may be added to the web browser using a plug-in function. Also, the screen of the web browser or a background screen of the content processing apparatus 100 may be converted into a screen for executing the search scrap book shown in FIG. 3, by selecting (or clicking) the added button.

Alternatively, the screen may be converted into the screen for executing the search scrap book shown in FIG. 3, by selecting (or clicking) the icon displayed on the display unit 150 of the content processing apparatus 100.

When the browser icon 320 is selected, the screen may be converted into a browser screen. When the option icon 330 is selected, various configurations of the search scrap book may be enabled.

Figure 4A:
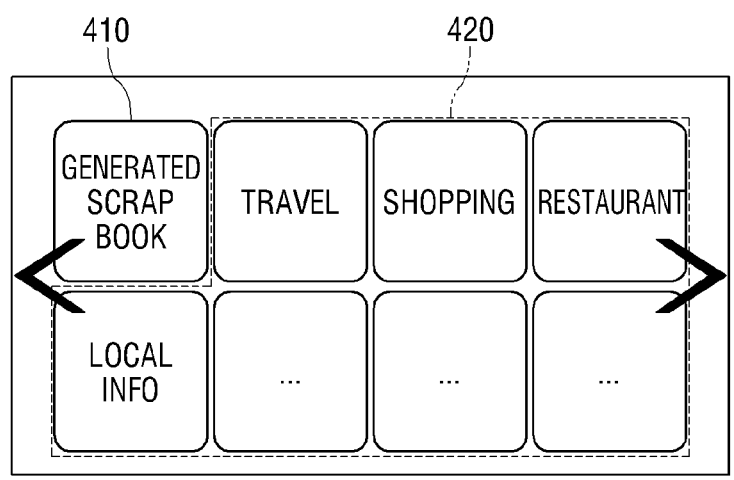
FIGS. 4A through 4C are diagrams illustrating a default screen of a scrap book search.
Figure 4B:
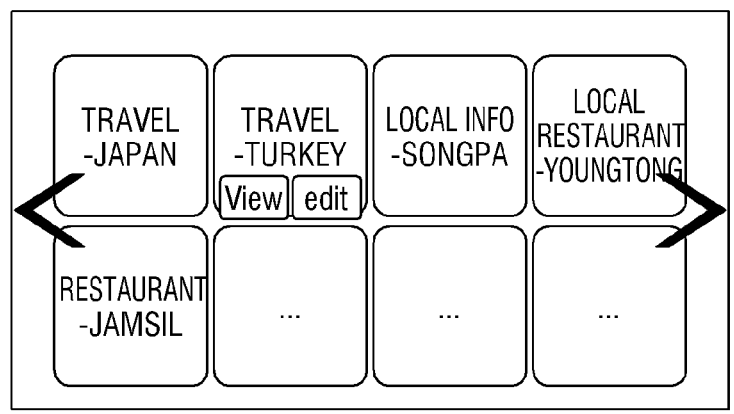
Figure 4C:
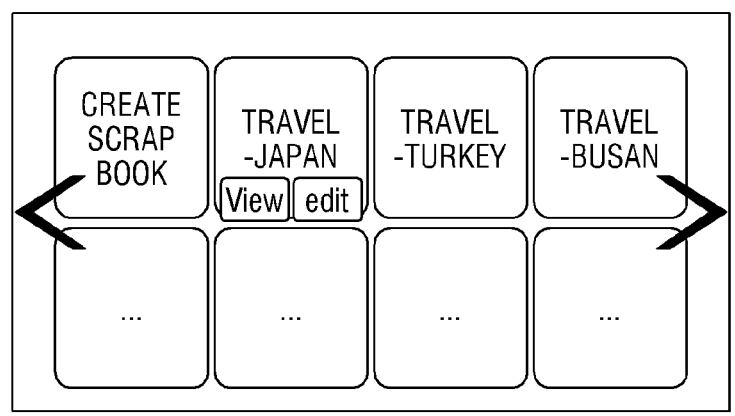

FIGS. 4A through 4C are diagrams illustrating a default screen of the search scrap book.

Referring to FIG. 4A, an icon 410 for showing the scrap book that has been already generated by a user, and a plurality of icons 420 representing the scrap book of the main category may be displayed on the display unit 150 of the content processing apparatus 100.

When the icon 410 is selected by a user, a screen as shown in FIG. 4B may be displayed on the display unit 150. Icons representing a plurality of scrap books such as travel-Japan, travel-Turkey, and local information-Songpa that have already been generated by a user may be displayed on the display unit 150.

When a travel icon is selected from the plurality of icons 420 by a user, a screen as shown in FIG. 4C may be displayed on the display unit 150. Icons representing scrap books such as travel-Japan, travel-Turkey, and travel-Busan that are sub-categories subordinate to travel that is a main category may be displayed on the display unit 150. Also, an icon for generating a new scrap book may be displayed on the display unit 150.

On the other hand, when a focus is placed on one of the icons representing the scrap books, as shown in FIGS. 4B and 4C, at least one mini icon overlapping the icon representing the scrap book may be displayed on the display unit 150. The mini icon may include a first mini icon for viewing the scrap book and a second mini icon for editing the scrap book.

Figure 5B:
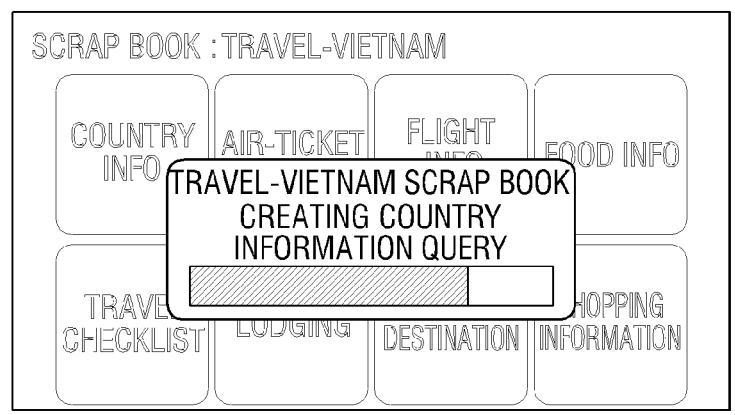
Figure 5C:
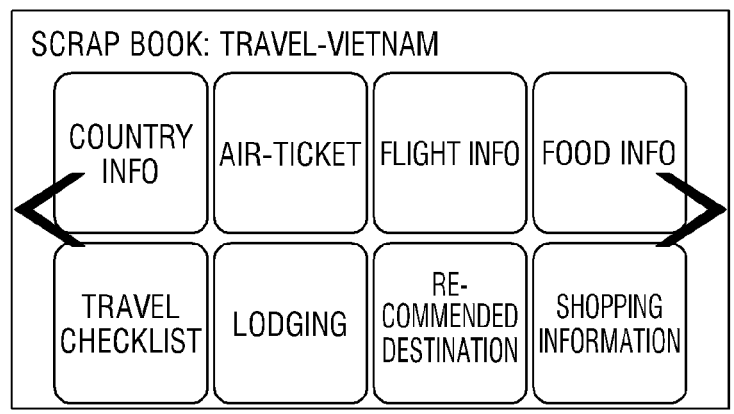

FIGS. 5A through 5C are diagrams illustrating an operation of generating a new scrap book.

When the icon for generating a new scrap book as shown in FIG. 4C is selected, a screen as shown in FIG. 5A may be displayed on the display unit 150. Specifically, a screen for receiving a keyword used to generate a scrap book may be displayed on the display unit 150.

The screen for receiving the keyword may include a space for inserting a necessary keyword that has to be inputted and a space for inserting an optional keyword that may be additionally inputted. Also, the content processing apparatus 100 may be set to generate a scrap book using a corresponding keyword at a predetermined time interval.

If a button for generating a scrap book is selected after the keyword of a user is inputted, a window showing a progress level, as shown in FIG. 5B, may be displayed on the display unit 150 in the course of the generation of the scrap book.

The content processing apparatus 100 may generate a query by combining a main category (such as "travel"), a keyword inputted from a user, and a sub-category (such as "country information", "flight information", and "food information"). The content processing apparatus 100 may retrieve content using the generated query. In this case, the retrieved content may be classified and stored in scrap books such as country information, flight information, food information, travel checklist, lodging, recommended destination, and shopping information, respectively.

FIG. 5C illustrates a screen on which scrap books representing sub-categories of travel are displayed. As shown in FIG. 5C, the type and number of the scrap books generated as the sub-categories may be predetermined, and may be modified by a user.

Hereinafter, a method for generating a query will be described in detail with reference to FIGS. 5A through 5C.

First, when the main category is "travel", and the user's keyword is "Vietnam" in FIG. 5A. The content processing apparatus 100 may generate a query for retrieving a web page (content), by combining "country information" (which is a sub-category of "travel"), "travel", and "Vietnam". After the retrieval is performed using the generated query, the retrieved content may be stored in the sub-category scrap book "Country Information".

Next, when the main category is "travel", and the user's keyword is "Vietnam" in FIG. 5A, the content processing apparatus 100 may generate a query for retrieving a web page (content), by combining "flight information" (which is a sub-category of "travel"), "travel", and "Vietnam". After the retrieval is performed using the generated query, the retrieved content may be stored in the sub-category scrap book "flight information".

Thereafter, the content processing apparatus 100 may sequentially generate queries with respect to scrap books of all sub-categories such as "food information", "travel checklist", and "lodging", and then may perform retrieval operations to store retrieved content in the scrap book of the sub-categories, respectively.

The content processing apparatus 100 may generate queries with respect to the sub-categories, respectively, creating respective scrap books. Accordingly, it is possible for a user to more easily retrieve desired content using the generated queries.

Figure 6A:
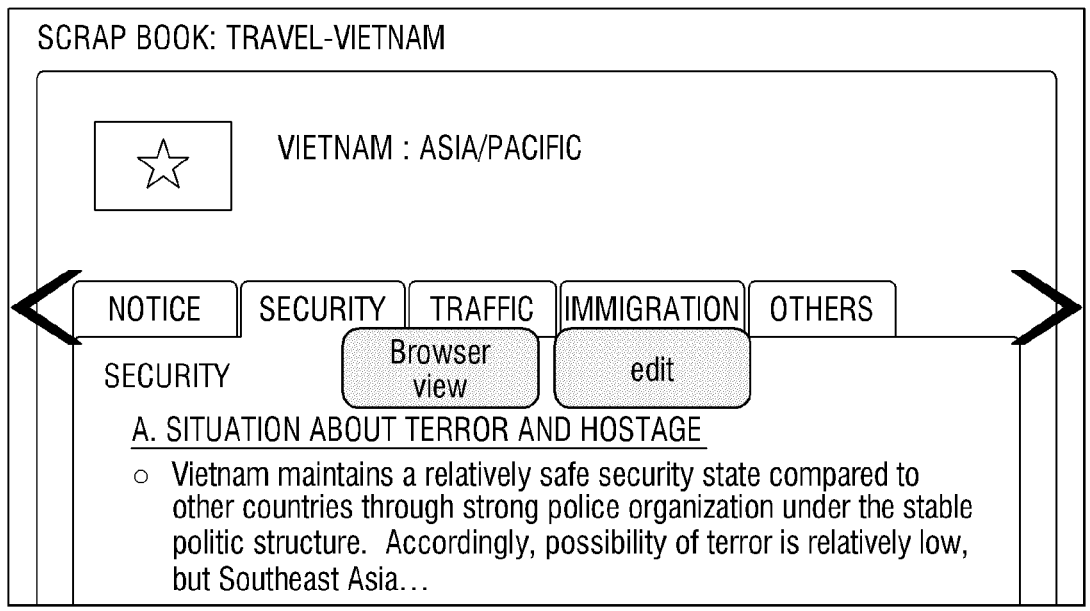
FIGS. 6A and 6B are diagrams illustrating an operation of viewing retrieved content of a sub-category.
Figure 6B:
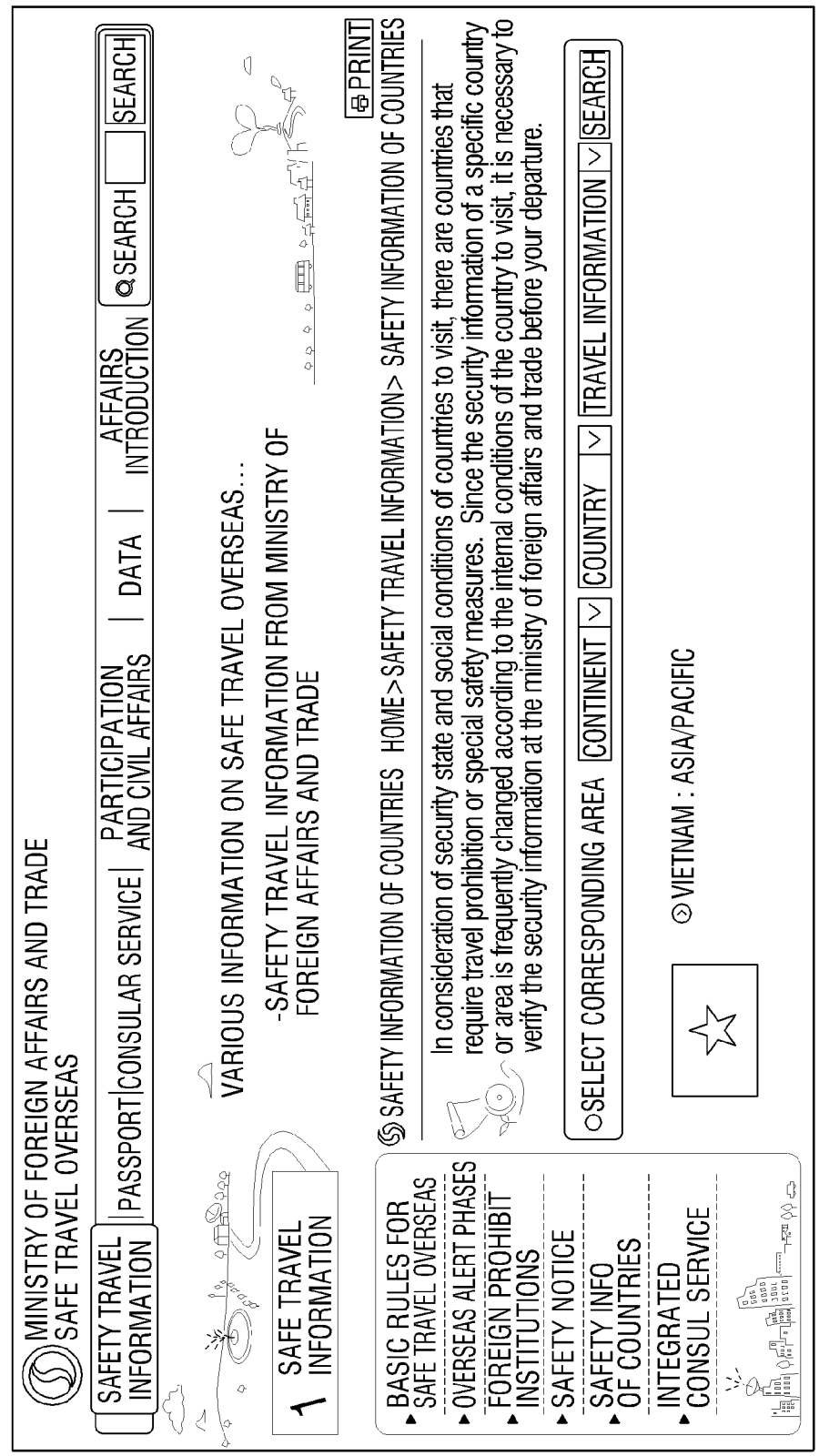

FIGS. 6A and 6B are diagrams illustrating an operation of viewing retrieved content of a sub-category.

In order to view the content of the scrap book of the sub-category as shown in FIG. 5C, a user may place a focus on a specific sub-category scrap book. In this case, if a mini icon for viewing the specific scrap book is displayed, the user may select the displayed mini icon.

Thus, the user may view the content of the specific scrap book as shown in FIG. 6A, and may view a web page of the retrieved specific scrap book as shown in FIG. 6B, by selecting one of a browser view or an edit icon.

Figure 7A:
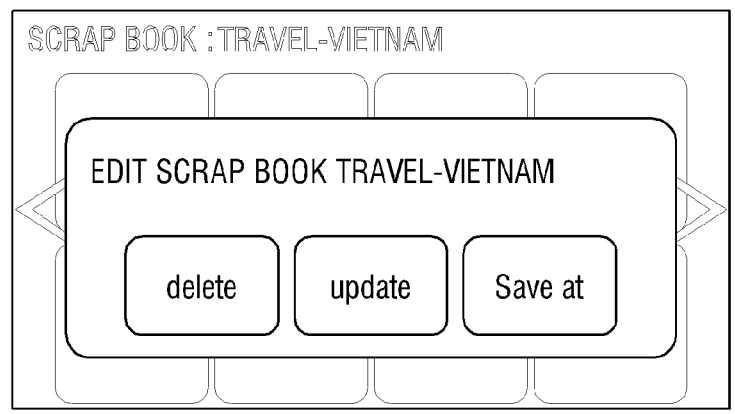
FIGS. 7A through 7C are diagrams illustrating an operation of editing content of a scrap book.
Figure 7B:
Figure 7C:
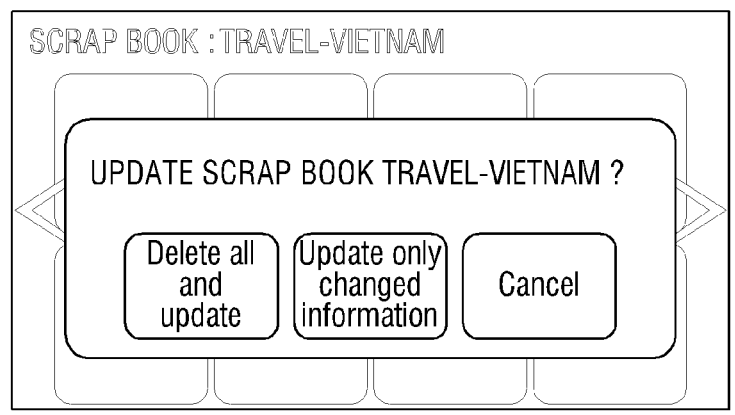

FIGS. 7A through 7C are diagrams illustrating an operation of editing content of a scrap book;

The content of the scrap book may be edited by selected an edit button shown in FIG. 4C or FIG. 6A.

As shown in FIG. 7A, the editing may include one of deleting and updating of the content.

As shown in FIG. 7B, when a delete button is selected, the content may be all or partially deleted. In one embodiment, only the content may be deleted, without deleting the layout of the scrap book.

As shown in FIG. 7C, when an update button is selected, the stored or retrieved content in the storage unit 110 may be updated. In one embodiment, the content may be updated by deleting all of the content of the scrap book and reloading all of the content. In another embodiment, only the portions of the scrap book that are to be modified are deleted and reloaded.

Figure 8:
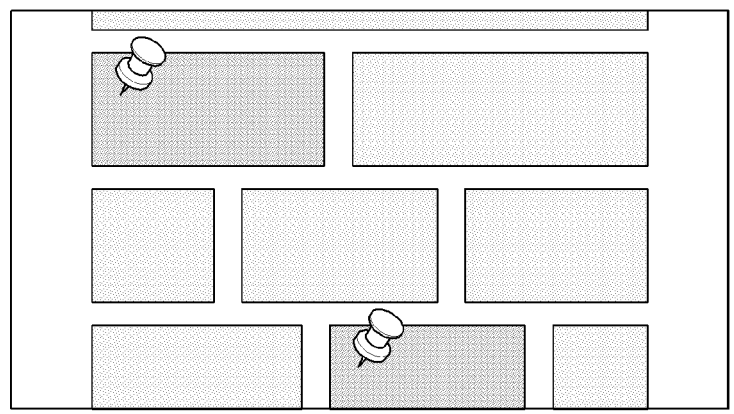
FIG. 8 is a diagram illustrating an operation of adding content to a scrap book.

FIG. 8 is a diagram illustrating an operation of adding content to a scrap book.

When a user views desired content while browsing the web page shown in FIG. 6B, as shown in FIG. 8, a corresponding block of the web page may be selected. Accordingly, the selected block may be clipped, and the clipped content may be stored in the storage unit 110.

Alternatively, instead of only a portion of the web page being added to the scrap book, the whole web page may also be added to the scrap book.

Figure 9:
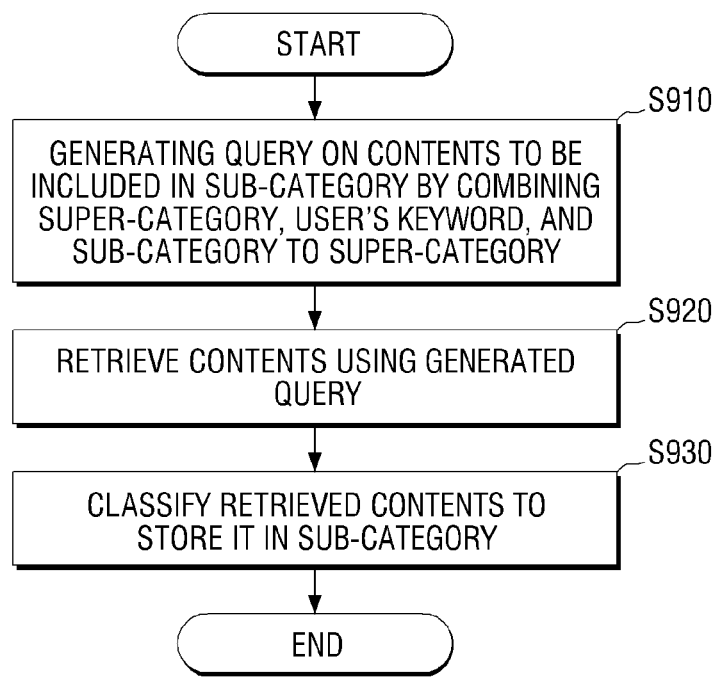
FIG. 9 is a flowchart illustrating a content processing method of a content processing apparatus according to an exemplary embodiment.

FIG. 9 is a flowchart illustrating a content processing method of a content processing apparatus according to an exemplary embodiment.

Referring to FIG. 9, in operation S910, a query generation unit 120 may generate a query for retrieving content to be included in a sub-category scrap book, by combining a main category, a user's keyword, and the sub-category which is subordinate to the main category (S910).

In operation S920, a retrieving unit 130 may retrieve the content using the generated query.

In operation S930, a storage unit 110 may classify and store the retrieved content in the sub-category.

The content processing method of the content processing apparatus may further include displaying a sub-category scrap book in which the retrieved content is stored in a form of an icon.

The content processing method of the content processing apparatus may further include receiving a user's keyword which is associated with the main category.

The content processing method of the content processing apparatus may further include displaying an icon representing the sub-category scrap book in which the retrieved content is classified and stored with an icon representing a main category scrap book.

The content processing method of the content processing apparatus may further include displaying at least one icon representing the sub-category scrap book in response to the icon representing the main category scrap book being selected.

The content processing method of the content processing apparatus may further include displaying at least one of a first mini icon for viewing the content comprised in the sub-category scrap book and a second mini icon for editing the content comprised in the sub-category scrap book in response to a focus being placed on the icon of the sub-category scrap book.

The content processing method of the content processing apparatus may further include displaying the content comprised in the sub-category scrap book on which the focus is placed in response to the first mini icon being selected.

According to the content processing method of the content processing apparatus, since a user can more easily retrieve desired content, and classify and display the main category and the sub-category subordinate to the main category conveniently, collection and management of content can more easily be achieved while minimizing the amount of input required from the user.

Detailed description of duplicate parts have been omitted.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for processing content in a content processing apparatus comprising a display unit for displaying images, comprising:
storing at least one template;
combining a user selected main category, a user's keyword, and at least one sub-category of the main category and generating a query, which comprises the combined user selected main category, the user's keyword, and the at least one sub-category of the main category, for retrieving content;
retrieving the content by using the generated query; and
classifying the content and storing the content in at least one sub-category scrap book arranged based on the at least one template;
wherein the display unit displays the classified content, and wherein the classified content is selectable by the user.

2. The method of claim 1, further comprising displaying the at least one sub-category scrap book in a form of an icon.

3. The method of claim 1, wherein the at least one sub-category is pre-stored in the content processing apparatus.

4. The method of claim 1,
wherein the at least one sub-category comprises at least one subordinate sub-category which is subordinate to the at least one sub-category and corresponds to the main category, and
wherein the generating of the at least one query comprises generating respective queries corresponding to the at least one sub-category and the at least one subordinate sub-category.

5. The method of claim 1, further comprising receiving the user's keyword which is related to the main category.

6. The method of claim 1, further comprising displaying at least one icon representing the at least one sub-category scrap book with an icon representing a main category scrap book.

7. The method of claim 6, further comprising displaying the at least one icon representing the at least one sub-category scrap book in response to an icon representing the main category scrap book being selected.

8. The method of claim 6, further comprising displaying at least one of a first mini icon for viewing the content in the at least one sub-category scrap book and a second mini icon for editing the content in the at least one sub-category scrap book in response to a focus being placed on the icon of the at least one sub-category scrap book.

9. The method of claim 8, further comprising displaying the content in the sub-category scrap book on which the focus is placed in response to the first mini icon being selected.

10. The method of claim 8, further comprising displaying a menu for editing the content in the sub-category scrap book on which the focus is placed in response to the second mini icon being selected,
wherein the editing of the content comprises at least one of deleting and updating of the content in the sub-category scrap book on which the focus is placed.

11. The method of claim 1, further comprising:
receiving a selection by a user of the main category which was selected from a plurality of main categories which are pre-stored prior to the user's selection in the content processing apparatus;
receiving the user's keyword which was input by the user and which is related to the main category,
wherein the at least one sub-category comprises a plurality of sub-categories which correspond to the main category and which are pre-stored prior to the user's selection of the main category in the content processing apparatus,
wherein the generating of the at least one query comprises generating respective queries corresponding to the plurality of sub-categories, and
wherein the at least one sub-category scrap book comprises a plurality of respective sub-category scrap books corresponding to the plurality of sub-categories.

12. An apparatus for processing content and displaying images, comprising:

a storage unit which stores the content and at least one template;

a query generation unit which combines a user selected main category, a user's keyword, and a sub-category of the main category and generates a query, which comprises the combined user selected main category, the user's keyword, and the sub-category of the main category, for retrieving the content to be stored;

a retrieving unit which retrieves the content by using the generated query;

a control unit which controls the storage unit such that the content is classified and stored in a sub-category scrap book arranged based on the at least one template; and a display unit which displays the classified content which is selectable by the user.

13. The apparatus of claim 12, further comprising the display unit which displays the sub-category scrap book in a form of an icon.

14. The apparatus of claim 13, wherein the sub-category is pre-stored in the storing unit.

15. The apparatus of claim 12,
wherein the sub-category comprises at least one subordinate sub-category which is subordinate to the sub-category and which corresponds to the main category, and
wherein the query generation unit generates respective queries corresponding to the sub-category and the at least one subordinate sub-category.

16. The apparatus of claim 12, further comprising a user input unit which receives the user's keyword that is related to the main category.

17. The apparatus of claim 13, wherein the control unit controls the display unit to display the icon representing the sub-category scrap book with an icon representing a main category scrap book.

18. The apparatus of claim 17, wherein the control unit controls the display unit to display the icon representing the sub-category scrap book, which is subordinate to the main category, in response to the icon representing the main category scrap book being selected.

19. The apparatus of claim 13, wherein the control unit controls the display unit to display at least one of a first mini icon for viewing the content in the sub-category scrap book and a second mini icon for editing the content in the sub-category scrap book in response to a focus being placed on the icon of the sub-category scrap book.

20. The apparatus of claim 19, wherein the control unit controls the display unit to display the content in the sub-category scrap book on which the focus is placed in response to the first mini icon being selected.

21. The apparatus of claim 19, wherein the control unit controls the display unit to display a menu for editing the content in the sub-category scrap book on which the focus is placed in response to the second mini icon being selected, and wherein the editing of the content comprises at least one of deleting and updating of the content in the sub-category scrap book on which the focus is placed.

* * * * *